United States Patent
Huyser et al.

(10) Patent No.: US 8,716,160 B2
(45) Date of Patent: May 6, 2014

(54) METHOD OF ACTIVATING A FISCHER-TROPSCH CATALYST

(75) Inventors: Johannes Jacobus Huyser, Parys (ZA); Matthys Josephus Janse van Vuuren, Sasolburg (ZA); Ryno Kotze, Sasolburg (ZA)

(73) Assignee: Sasol Technology (PTY) Limited, Johannesburg (ZA)

( * ) Notice: Subject to any disclaimer, the term of this patent is extended or adjusted under 35 U.S.C. 154(b) by 587 days.

(21) Appl. No.: 12/672,983

(22) PCT Filed: Aug. 5, 2008

(86) PCT No.: PCT/IB2008/053135
§ 371 (c)(1),
(2), (4) Date: Jul. 26, 2011

(87) PCT Pub. No.: WO2009/022262
PCT Pub. Date: Feb. 19, 2009

(65) Prior Publication Data
US 2011/0275512 A1    Nov. 10, 2011

(30) Foreign Application Priority Data
Aug. 10, 2007   (ZA) ................................ 2007/06647

(51) Int. Cl.
*B01J 38/02*  (2006.01)
*B01J 38/04*  (2006.01)
*B01J 38/10*  (2006.01)
*B01J 38/18*  (2006.01)
*B01J 21/00*  (2006.01)
*B01J 23/00*  (2006.01)
*B01J 23/58*  (2006.01)
*B01J 23/70*  (2006.01)
*B01J 23/74*  (2006.01)

(52) U.S. Cl.
USPC ................... 502/34; 502/50; 502/53; 502/56; 502/258; 502/328; 502/330; 502/331; 502/336; 502/338

(58) Field of Classification Search
USPC ......... 502/34, 50, 53, 56, 258, 328, 330, 331, 502/336, 338
See application file for complete search history.

(56) References Cited

U.S. PATENT DOCUMENTS 7,361,619 B2 * 4/2008 Malek et al. ..................... 502/20

OTHER PUBLICATIONS

Shin et al., JP Abstract, 61090739, 1986.*
International+ Search Report (PCT/IB2008/053135) dated May 12, 2009.
International Preliminary Report on Patentability (PCT/IB2008/053135) dated Nov. 23, 2009.
Robert J. O'Brien et al., "Activity and selectivity of precipitated iron Fischer-Tropsch catalysts," Catalysis Today, vol. 36, No. 3, Jun. 6, 1997, pp. 325-334, XP-002517249.
Robert J. O'Brien et al., "Activation Study of Precipitated Iron Fischer-Tropsch Catalysts," Energy & Fuels, vol. 10, Jul. 18, 1996, pp. 921-926, XP-002517250.
Dragomir B. Burkur et al., "Activation Studies with a Precipitated Iron Catalyst for Fischer-Tropsch Synthesis," Journal of Catalysis, vol. 155, Sep. 1, 1995, pp. 366-375, XP-002517251.
Dragomir B. Burkur et al., "Pretreatment effect studies with a precipitated iron Fischer-Tropsch catalyst in a slurry reactor," Applied Catalysis A: General, vol. 186, Oct. 4, 1999), pp. 255-275 XP 002517252.

* cited by examiner

*Primary Examiner* — Cam N. Nguyen
(74) *Attorney, Agent, or Firm* — Finnegan Henderson Farabow Garrett & Dunner LLP

(57) ABSTRACT

This invention relates to the field of Fischer-Tropsch catalysis, in particular to activation of a Fischer-Tropsch catalyst. More particularly the invention relates to a method of activating an iron based Fischer-Tropsch catalyst which includes iron in a positive oxidation state by contacting in a reactor said iron based catalyst with a reducing gas selected from the group consisting of CO and a combination of $H_2$ and CO; at a temperature of at least 245° C. and below 280° C.; at a reducing gas pressure of above 0.5 MPa and not more than 2.2 MPa; and at a GHSV of total gas fed to the reactor of at least 6000 ml(N)/g cat/h, thereby reducing the iron that is in a positive oxidation step in the catalyst.

11 Claims, No Drawings

METHOD OF ACTIVATING A FISCHER-TROPSCH CATALYST

FIELD OF THE INVENTION

This invention relates to the field of Fischer-Tropsch catalysis, in particular to activation of a Fischer-Tropsch catalyst.

BACKGROUND ART

A Fischer-Tropsch (FT) process comprises the hydrogenation of CO in the presence of a catalyst based on metals, such as Fe, Co and Ru. The products formed from this reaction are water, gaseous, liquid and waxy hydrocarbons which may be saturated or unsaturated. Oxygenates of the hydrocarbons such as alcohols, acids, ketones and aldehydes are also formed.

A heterogeneous Fisher-Tropsch process may be conveniently categorised as either a high temperature Fischer-Tropsch (HTFT) process or a low temperature Fischer-Tropsch (LTFT) process. The HTFT process can be described as a two phase Fischer-Tropsch process. It is usually carried out at a temperature from 250° C. to 400° C. and the catalyst employed is usually an iron-based catalyst. Generally, the process is commercially carried out in a fluidised bed reactor.

The LTFT process can be described as a three phase Fischer-Tropsch process. It is usually carried out at a temperature from 220° C. to 310° C. and the catalyst employed is usually either a Co-based catalyst or a Fe-based catalyst. The conditions under which this process is carried out, results in the products being in a liquid and possibly also in a gas phase in the reactor. Therefore this process can be described as a three phase process, where the reactants are in the gas phase, at least some of the products are in the liquid phase and the catalyst is in a solid phase in the reaction zone. Generally this process is commercially carried out in a fixed bed reactor or a slurry bed reactor.

It is well-known that HTFT synthesis is preferred for the production of high value linear alkenes, and iron catalysts, operating at high temperatures in fluidised bed reactors, remain the catalysts of choice. LTFT synthesis using iron catalysts are usually the synthesis procedure of choice for the conversion of coal-derived synthesis gas ($H_2$ and CO) to hydrocarbon products.

It is well known that in LTFT, especially in the production of heavy hydrocarbon products, a common problem is the relative slow synthesis rate and short catalyst lifetime. It is normal practise to try and solve such problems by an increase in reaction temperature to increase reaction rate, but this has lead to an increase in lighter hydrocarbon production (notably methane) as well as catalyst deactivation that results in a short catalyst lifetime.

Most procedures for preparing an iron based catalyst for FT synthesis produces a non-reduced catalyst wherein at least some (usually most) of the iron in the catalyst is in a positive oxidation state. In order to provide a catalyst which is active in FT synthesis (an activated FT catalyst) the catalyst has to be reduced to convert iron in the positive oxidation state to iron in a zero oxidation state.

Catalysis Today 36 (1997) 325; Canadian J. Chem. Eng., 74 (1996) 399-404; Applied Catalysis. A: General 186 (1999) 255-275; Journal of Catalysis 155, (1995) 366-375 and Energy and Fuels, 10 (1996) 921-926 describe different catalyst activation procedures and their influence on FT synthesis. The influence of different reducing gasses ($H_2$, CO, or a combination of $H_2$ and CO) used during activation is disclosed. Reduction at different pressures and temperatures are also disclosed. However, none of the documents disclose the activation conditions of the present invention.

It has now been found that by following a certain activation procedure of the Fischer-Tropsch synthesis catalyst the synthesis rate and catalyst lifetime can be influenced. In particular it has been found that activation of the catalyst by reduction at a temperature of at least 245° C. and below 280° C., a pressure of above 0.5 MPa and not more than 2.2 MPa of reducing gas, and a GHSV of feed gas to the reactor of above 6000 ml(N)/g cat/h provided a catalyst with certain advantages especially when used in LTFT. These advantages may include one or more of high activity and long catalyst lifetime.

SUMMARY OF THE INVENTION

According to the present invention there is provided a method of activating an iron based Fischer-Tropsch catalyst which includes iron in a positive oxidation state by contacting in a reactor said iron based catalyst with a reducing gas selected from CO and a combination of $H_2$ and CO; at a temperature of at least 245° C. and below 280° C.; at a reducing gas pressure of above 0.5 MPa and not more than 2.2 MPa; and at a GHSV of total gas fed to the reactor of at least 6000 m(N)/g cat/h, thereby reducing the iron that is in a positive oxidation state in the catalyst.

Activation of the Iron-Based Catalyst

The catalyst may comprise a low temperature Fischer-Tropsch catalyst, that is a catalyst suitable to be used in a three-phase FT process, preferably in a slurry bed reactor.

The iron catalyst may include one or more promotors such as a promotor that enhances reduction and/or a structural promotor.

The iron catalyst may include a promotor in the form of a source of an alkali metal and/or an alkaline earth metal. Preferably the promotor is in the form of a source of an alkali metal and preferably the alkali metal is K, Na or Cs, preferably it is K. Preferably the source of alkali metal is an alkali metal oxide such as $Na_2O$, $K_2O$ or $Cs_2O$, preferably it is $K_2O$. The alkali metal may be present at a concentration of 3 to 6 g alkali metal oxide/100 gFe, preferably 4.3 to 5 g alkali metal oxide/100 gFe.

The iron catalyst may also include a transition metal promotor, and preferably the transition metal is Cu. It is believed that Cu enhances reduction of an iron based catalyst. The Cu may be present at a concentration of 0.5 to 8 g Cu/100 gFe, preferably from 3 to 6 g Cu/100 gFe.

The iron catalyst may also include a structural promotor, and preferably it is $SiO_2$. The $SiO_2$ may be present at a concentration of 7 to 45 g $SiO_2$/100 gFe, preferably from 22 to 26 g $SiO_2$/100 gFe.

The catalyst may be prepared by any suitable procedure such as precipitation.

Preferably at least some of the iron is present as $Fe^{2+}$ and/or $Fe^{3+}$ prior to reduction and preferably at least some of the iron is reduced to Fe(0).

Preferably not more than 15%, preferably not more than 10%, preferably 0% by mass of the iron in the catalyst is in Fe(0) form prior to reduction according to the present invention.

The catalyst may be provided in a fixed bed in the reactor, but preferably the catalyst is provided in a slurry bed in the reactor. The catalyst may be mixed with a suitable carrier such as a wax to prepare a slurry bed in a slurry bed reactor.

Reactor

Any suitable reactor may be used to reduce the iron catalyst. Preferably the reactor is a reactor suitable for carrying out LIFT synthesis. Preferably the reactor is a fixed bed reactor or a slurry bed reactor. Preferably the reactor is a slurry bed reactor.

Reducing Gas

As stated above the reducing gas comprises a gas selected from CO and a combination of $H_2$ and CO. The combination of $H_2$ and CO is also known as syngas. Preferably the reducing gas is a combination of $H_2$ and CO. The syngas may be prepared in any suitable manner and in one embodiment of the invention the syngas may be coal derived syngas. Preferably the $H_2$/CO molar ratio is from 100:1 to 1:100, preferably from 5:1 to 1:5, preferably from 1:2 to 2:1.

The reducing gas may form part of a feed gas which includes one or more other gasses such as, for example, light hydrocarbon products of FT synthesis, or inert gasses for instance $CO_2$, argon and nitrogen.

Reduction Temperature

As stated above the temperature at which reduction of the catalyst is carried out is at least 245° C. to below 280° C., preferably below 270° C. and more preferably between 250° C. to 265° C.

Reduction Pressure

As stated above reduction of the catalyst is carried out at a reducing gas pressure above 0.5 MPa and not more than 2.2 MPa.

It will be appreciated that the reducing gas pressure is the pressure of all reducing gas in the reactor capable of reducing iron under the conditions present in the reactor, and excludes the pressure of all gas that does not reduce iron (such as $CO_2$ and argon).

Preferably the said pressure is below 2.0 MPa and above 0.5 MPa. Preferably said pressure is from 1.0 MPa to 1.8 MPa.

GHSV

As stated above the GHSV of total gas fed to the reactor is at least 6000 ml(N)/g cat/h. Preferably said GHSV is at least 7000 ml(N)/g cat/h, preferably at least 9000 ml(N)/g cat/h, preferably at least 10000 ml(N)/g cat/h.

Reduction

Reduction time may be up to 36 hours, preferably up to 24 hours, preferably up to 16 hours.

According to another aspect of the present invention there is provided an activated iron FT catalyst prepared by the activation process as described above.

The invention will now be further described by means of the following non-limiting examples.

EXAMPLES

The Fe based catalyst used in the examples was prepared to have the specifications set out below and was prepared according to the procedure described by Frohning et al (C. D. Frohning, W. Rotting, F. Schnur, J. Falbe (Ed), "Chemierohstoffe aus kohle", Thieme, Stuttgart, 1977, p 234.)

Fe 45-60 mass %
Cu 3-6 g/100 g Fe
$K_2O$ 4.3-5 g/100 g Fe
$SiO_2$ 22-26 g/100 g Fe

Example 1

This example is concerned with an FT process run under standard conditions with a catalyst that is activated as in the prior art.

10 gram of a Fe based catalyst described above was added to 350 g of H1 wax (commercially produced by Sasol Wax South Africa (Pty) Limited) at 150° C. in a slurry reactor. The slurry reactor was closed and pressurised with argon to 2.0 MPa. The temperature of the reactor was increased to 240° C. and at that temperature, syngas ($H_2$/CO molar ratio of 1.5) was passed through the reactor at a GHSV of 4000 ml(N)/g cat/h and maintained for 16 hours. A fresh feed and tail gas GC analysis was done and used to calculate rates and conversions. After this activation/reduction period the temperature was increased to 245° C. and the reactor pressure unchanged at 2.0 MPa and the GHSV increased to 5600 ml(N)/g cat/h to maximise the FT synthesis reaction rate for the production of hydrocarbon products. The FT reaction rate was $0.7 \times 10^{-5}$ mole CO/g cat/sec and the methane selectivity stabilised at ~1.5%.

Example 2

This example is concerned with an FT process that is run under the same conditions as specified in example 1, but wherein the activation of the catalyst is according to the present invention 10 gram of a Fe based catalyst described above was added to 350 g of the commercially produced H1 wax at 150° C. in a slurry reactor. The slurry reactor was closed and pressurised with argon to 1.5 MPa. The temperature of the reactor was increased to 255° C. and at that temperature, syngas ($H_2$/CO molar ratio of 1.5) was passed through the reactor at a GHSV of 12000 ml(N)/g cat/h and maintained for 16 hours. A fresh feed and tail gas GC analysis was done and used to calculate rates and conversions. After this activation/reduction period the temperature was changed to 245° C. and the reactor pressure increased to 2.0 MPa and the GHSV dropped to 5600 ml(N)/g cat/h to maximise the FT synthesis reaction rate for the production of hydrocarbon products. The FT reaction rate remained constant at $0.9 \times 10^{-5}$ mole CO/g cat/sec with no loss in activity detected for at least 200 hours. The methane selectivity stabilised at ~1.7% indicating no change in overall selectivity.

Discussion of the Above Examples

It is clear from examples 1 and 2 that when catalysts are not activated according to the present invention there is a much lower Fischer Tropsch activity compared to the example wherein the catalyst is activated according to the invention.

The invention claimed is:

1. A method of activating an iron based Fischer-Tropsch catalyst which includes iron in a positive oxidation state comprising contacting in a reactor said iron based catalyst with a reducing gas selected from the group consisting of CO and a combination of $H_2$ and CO at a $H_2$/CO molar ratio from 100:1 to 1:100, at a temperature of at least 245° C. and below 280° C., at a reducing gas pressure of above 0.5 MPa and not more than 2.2 MPa and at a GHSV of total gas fed to the reactor of at least 6000 ml(N)/g cat/h, thereby reducing the iron that is in a positive oxidation state in the catalyst.

2. The method according to claim 1, wherein the iron based catalyst includes one or more promoters selected from the group consisting of a source of an alkali metal, a source of an alkaline earth metal, a source of Cu and a source of Si.

3. The method according to claim 1 or claim 2, wherein the iron based catalyst includes between 3 to 6 g alkali metal oxide per 100 g of Fe.

4. The method according to claim 1 or claim 2, wherein the iron based catalyst includes between 0.5 to 8 g Cu per 100 g of Fe.

5. The method according to claim 1 or claim 2, wherein the iron based catalyst includes a structural promoter in the form of $SiO_2$, the structural promoter being present at a concentration of 7 to 45 g $SiO_2$ per 100 g of Fe.

6. The method according to claim 1, wherein the reducing gas comprises a mixture of $H_2$ and CO, the $H_2$/CO molar ratio in the reducing gas being from 5:1 to 1.5.

7. The method according to claim 1, wherein the temperature at which reduction of the catalyst is carried out between 250° C. and 265° C.

8. The method according claim 1, wherein reduction of the catalyst is carried out at a reducing gas pressure of between 1.0 MPa to 1.8 MPa.

9. The method according to claim 1, wherein the GHSV of total gas fed to the reactor is at least 10000 Ml(N)/g cat/h.

10. The method according to claim 1, wherein the reduction time is between 18 to 36 hours.

11. The method according to claim 1, wherein the catalyst is provided in a slurry bed reactor.

* * * * *

UNITED STATES PATENT AND TRADEMARK OFFICE
CERTIFICATE OF CORRECTION

| | |
|---|---|
| PATENT NO. | : 8,716,160 B2 |
| APPLICATION NO. | : 12/672983 |
| DATED | : May 6, 2014 |
| INVENTOR(S) | : Johannes Jacobus Huyser et al. |

Page 1 of 1

It is certified that error appears in the above-identified patent and that said Letters Patent is hereby corrected as shown below:

On the Title Page

Abstract, Line 4, "iron based" should read as --iron-based--.

Abstract, Line 6, "iron based" should read as --iron-based--.

In the Claims

Claim 1, Col. 4, Line 44, "iron based" should read as --iron-based--.

Claim 1, Col. 4, Line 46, "iron based" should read as --iron-based--.

Claim 2, Col. 4, Line 54, "iron based" should read as --iron-based--.

Claim 3, Col. 4, Line 59, "iron based" should read as --iron-based--.

Claim 4, Col. 4, Line 62, "iron based" should read as --iron-based--.

Claim 5, Col. 4, Line 65, "iron based" should read as --iron-based--.

Signed and Sealed this
Nineteenth Day of August, 2014

Michelle K. Lee
*Deputy Director of the United States Patent and Trademark Office*